INVENTOR.
ALKIS C. MAKRIDES

United States Patent Office 3,316,125
Patented Apr. 25, 1967

3,316,125
ELECTROCHEMICAL CELLS
Alkis C. Makrides, Newton, Mass., assignor to Tyco Laboratories, Inc., Waltham, Mass., a corporation of Massachusetts
Filed Sept. 21, 1964, Ser. No. 397,813
11 Claims. (Cl. 136—6)

This invention relates to electrochemical cells and their use and pertains more directly to method and means for improving the shelf life of batteries.

Subsequent to launching of a missile, satellite, or manned spacecraft, hardly any factor is more vital to successful operation than reliable performance of its power systems. Accordingly, the development of space vehicles has created a severe demand for reliable primary and secondary cells for providing electrical energy aboard such vehicles. Shelf life is important, although more so with primary cells than secondary cells since in the former the loss of energy caused by self-discharge or local action while on open circuit cannot be overcome by recharging. Self-discharge or local action is the phenomenon in which one or both of the electrodes of a cell lose their capacity without current having been drawn through the external circuit. As far as the anode or negative electrode is concerned, the main waste process is anode corrosion which involves oxidation combined with a cathodic process occurring directly on the anode. A metal anode in a primary battery undergoes oxidation according to a process which may be represented by $$M \rightarrow M^{z+} + ze \tag{1a}$$

or $$M + x(OH^-) \rightarrow M(OH)_x + xe \tag{1b}$$

where M represents a reactive battery anode material such as Mg, Zn, Fe, Cd, etc., $z$ and $x$ represent an integer, and $e$ represents one electron. In battery operation, the anodic oxidation reaction is coupled via the external circuit to the cathode, while in corrosion it is coupled to a cathodic reaction, usually hydrogen evolution or oxygen reduction, occurring on the same electrode. In recognition of the fact that high energy primary cells utilize anode materials which are highly active and will corrode in the battery electrolyte, several methods have been evolved in order to prevent or minimize anode corrosion so as to get extended shelf life. In one, the electrolyte is kept in a separate compartment and is introduced into the cell upon demand. Another method is to thermally activate the battery by a pyrotechnic compound, as described and illustrated in U.S. Patent No. 3,132,971, issued May 12, 1964, to Sidney M. Selis et al., for "Compact Type High Power Battery." Another approach has been to store the batteries at low temperatures where electrode corrosion reactions occur at a very low rate. All of these approaches have obvious limitations. Another approach that has been considered to decrease anode corrosion is to inhibit the cathodic process occurring at the anode. However, except in the case of zinc anodes where amalgamation has been used to raise the hydrogen overpotential without seriously affecting the rate of anodic dissolution of zinc, it generally has not been possible to inhibit the rate of the cathodic-corrosion reaction at the anode without also inhibiting the anodic reaction rate. It is apparent, therefore, that some other method of minimizing anode corrosion is desirable in order to achieve extended shelf life.

Accordingly, the primary object of this invention is to provide a way of decreasing anode corrosion in a cell during storage without seriously affecting the anodic reaction rate of the cell during use as a power supply.

A more specific object is to provide a way of extending the shelf life of a battery cell by inhibiting anode corrosion without need for keeping the anode separated from the cell electrolyte.

A further object of the invention is to provide a way of suppressing anode corrosion in a cell until it is actually used which is applicable to a variety of battery systems employing either alkaline or acid electrolytes.

Another object of the invention is to make it possible to use highly active anode materials in battery cells without any substantial corrosion while the cells are not in use.

Other objects, features, and advantages of the invention will become apparent from the following description and from the drawings wherein.

Anode corrosion control as achieved by the present invention involves the concept of anode passivation induced by anodic polarization. Passivation denotes a state in which the surface of the anode has been rendered substantially inactive to its environment, involving a substantial reduction in the rate of the anodic (electron-producing) reaction which characterizes the main waste process when the cell is on open circuit. As contemplated by the present invention, anode passivation is maintained until the cell is to be used, at which time it can be simply and rapidly activated.

Figure 1:
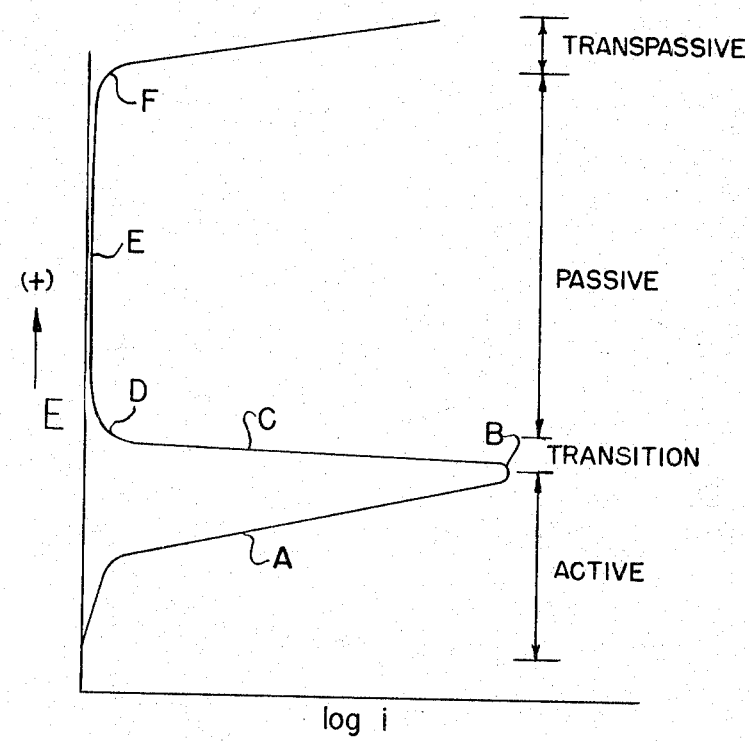
FIG. 1 is a typical anodic polarization curve which is utilized in the present invention.

The phenomenon of anode passivation by anodic polarization is well known in the art of corrosion control of large alloy steel vessels used in chemical processes to contain highly corrosive materials such as $H_2SO_4$, $H_3PO_4$, $HNO_3$, $NH_4NO_3$, $Al_2(SO_4)_3$, LiOH, and NaOH. See articles by Sudbury et al., Shock et al., and Riggs et al. in Corrosion, vol. 16, No. 2, February 1960, pp. 47t–62t, which relate to anodic protection of large vessels. The phenomenon of anode passivation is best described by examination of a typical anode polarization curve (FIG. 1) which is a plot of E (anode potential) in volts vs. log $i$ (anode current) in amps/cm.$^2$ curve. The illustrated polarization curve is the result of measuring an anodic polarization current which passes through an anode as its potential is shifted by means of a potentiostat (an instrument including an external power supply and a potential controller which maintains the potential of a working electrode, e.g., an anode, fixed at any desired value relative to a reference electrode by regulating a polarizing current supplied to it from the external power supply via another electrode and an electrolyte). For the purpose of deriving the illustrated polarization curve, the electrolyte must be an oxygen-containing environment. By way of definition, an anodic current is one which produces oxidation at the anode, e.g., according to the preceding reaction equations, while a cathodic current is one which produces reduction at the anode, e.g., according to the following reaction:

$$M^{z+} + ze \rightarrow M \tag{2}$$

When the anodic polarization current begins to flow through the anode from the potentiostat's power supply, the resulting reaction is oxidation. As the potential shifts in the positive direction, the current begins to increase as illustrated by the portion A of the anodic polarization curve. The current continues to increase with the potential until a critical value B is reached at which the current stops increasing and begins to decrease. A further increase in potential beyond the potential represented by point B produces a drop in current flow as illustrated by the portion C of the curve. This reverse phenomenon ceases at about point D where relatively large increases in anode potential will be attended by very small applied currents. The latter phenomenon occurs in the region defined by the portion E of the curve and ceases at a high level potential represented by point F where further increases in anode potential will yield relatively large increases in applied current. For the purposes of this invention, the point B is termed the "critical potential"; the potential range below the critical potential is termed the "active region"; the potential range above the critical potential to the level of about point D is termed the "transition region"; the potential range above point D to the level of point F is termed the "passive region"; and the potential region above the level of point F is termed the "transpassive region." The significance of these terms is that corrosion occurs at an accelerating rate in the active region, occurs at a decelerating rate in the transition region, has a very low rate in the passive region (passivity is a relative term and very seldom is the corrosion rate zero), and reoccurs again at an accelerating rate in the transpassive region.

Anode passivation by anodic polarization involves the formation of an adhesive film or layer on the anode which is insoluble or only slightly soluble in the electrolyte environment of the anode and whose thickness is a function of anode potential. This film results from the oxidizing reaction occurring at the anode and is essentially an oxygen-containing film. The exact nature of this anode-passivating film is not known, but it is generally believed to fall into one of several categories. First of all, it is proposed that the anode metal dissolves and then reacts with oxygen supplied by or via the anode's electrolyte environment to form protective precipitates which deposit on the anode as a thin, continuous adherent film that functions as a barrier or highly resistive impedance to current flow. The oxygen may be part of the active electrolyte, e.g., KOH, or it may be supplied by some other constituent of the electrolyte medium, e.g., water. Another explanation is that passivity is caused by approximately a monolayer of adsorbed oxygen. A more likely explanation is that initially oxygen is adsorbed on the surface of the anode and that this is followed by migration of the metal from the metal anode per se into the adsorbed oxygen film to form an amorphous metal-oxygen structure which for all intents and purposes may be considered to be a metal oxide or oxides. Whatever the correct explanation, the essential fact is that an oxygen-containing film is formed at or above the critical potential and that this film sharply increases the impedance of the anode and thereby passivates it against corrosion currents. Moreover, the continual existence of the film is dependent upon the potential gradient upon it. In this connection, it may be considered that the oxidation current at any given potential in the passive region corresponds to the rate at which metal ions leave the anode per se, migrate through the current limiting film, and are incorporated as metal oxide. The rate of migration through the film is governed by the field across it, i.e., by the potential divided by the film thickness. For a passive electrode in a steady state, the rate of the oxygen-containing film formation equals the rate of dissolution of the same film. If the anode potential is raised after a steady state is achieved, the film forms faster than it dissolves since the potential gradient is now greater. Consequently, the film thickens until the field is reduced to its previous value, at which point the rate of film buildup and dissolution again balance each other. The process is repeated if the potential is again increased within the passive region. The increase in film thickness is accompanied by a temporary increase in current which attenuates to its original value as the rate of buildup and dissolution come back into balance. Thus, in the passive region, even though the film thickness may increase as the potential is increased, the oxidation (corrosion) current tends to remain at a constant, low value. A passive anode will revert to an active state, i.e., to one where oxidation is freely occurring, if its potential is allowed to fall below the critical potential.

Thus, to maintain an anode passive it is necessary to maintain a current flow through the anode sufficient to keep its potential in the passive range.

Application of the phenomenon of active-passive anode transitions to extend the shelf life of a primary reserve battery involves application to the battery anode of an anodic current sufficient to cause its potential to exceed the critical potential followed by an anodic current sufficient to maintain the anode passive until ready for use. A passive battery anode will revert to its original active state, i.e., to one where oxidation is freely occurring, if its potential is allowed to fall below the critical potential. This can be done either by removing the external bias and allowing the oxygen-containing film to dissolve in the electrolyte or by reversing the bias and electrochemically reducing the oxide. The first method is termed "spontaneous activation" while the second is referred to as "forced activation." Once the film is removed, current can be drawn through the battery anode until it is depleted or until its potential is above the critical passivation potential.

The feasibility of application of the concept of anode passivation by anodic polarization to extend the shelf life of batteries arises from the relative magnitudes of the anodic current required to initially passivate an anode, the anodic current required to maintain it passive, and also the cathodic current required to activate it. The critical current is typically of the order of 0.1 to 1 amp/cm.$^2$, depending upon the anode material, the composition of the electrolyte environment for the anode, the geometry of the anode, and the temperature. On the other hand, the current required for maintaining the anode passive is very small, typically of the order of $10^{-6}$ to $10^{-8}$ amps/cm.$^2$, again depending on anode material, electrolyte composition, electrode geometry, and temperature. The current for activation is substantially arbitrary; its magnitude determines the time required for activation. Typically, a current of a few milliamps/cm.$^2$ will cause activation in a time interval in the order of 1 second.

As noted previously, the current in the passive region corresponds closely to the rate of dissolution of the oxygen-containing film on the anode. Hence, this current gives directly the rate of corrosion of the anode in the passive region. A corrosion current of $10^{-7}$ amps/cm.$^2$ corresponds to oxidation of about $3.2 \times 10^{-5}$ equivalents/cm.$^2$/year or, assuming a two-electron oxidation reaction such as $M \rightarrow M^{+2} + 2e$ and an atomic weight of about 50, to the loss of about $8 \times 10^{-4}$ grams/cm.$^2$/year. This low rate of loss is characteristic of a passivated anode and gives rise to a battery shelf life as great as five years or more, depending upon initial anode size.

Figure 2:
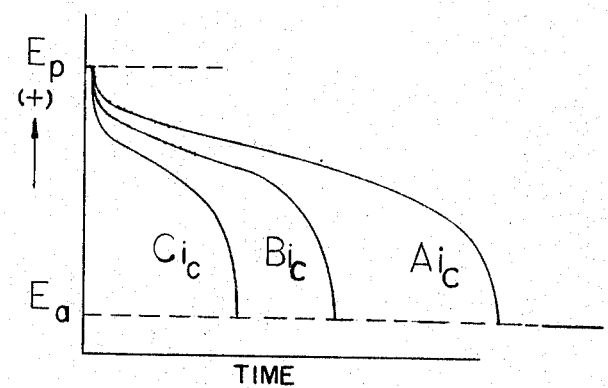
FIG. 2 illustrates typical anode depolarization curves.

The current required to achieve reactivation depends upon the film thickness and the desired reactivation time. For an oxide film thickness in the order of 30 A. and a reactivation time of 0.1 second maximum, the required current can be easily estimated. For example, for an anode of Ni, a film thickness of approximately 30 A. corresponds to a total charge for reduction of about 500 $\mu$coulombs/cm.$^2$. Therefore, the cathodic current $i_c$ required to achieve activation in the time $t$ must be that $i_c t$ is approximately $5 \times 10^{-4}$ coulombs/cm.$^2$. If $t = 0.1$ sec., then $i_c = 5 \times 10^{-3}$ amp/cm.$^2$. Actually, somewhat smaller currents may cause activation in the desired time. If so, the difference in the amount of current required to cause reactivation may be due to the fact that a certain amount of self-reduction occurs when the film becomes partially reduced and the underlying metal is exposed to the electrolyte. The fact that the reactivation time is a function of the magnitude of the reactivation current is demonstrated by FIG. 2, which shows the reactivation response of the same anode to three different cathodic pulses $Ai_c$, $Bi_c$, $Ci_c$, having the same time duration but differing in magnitude as follows:

$$Ci_c > Bi_c > Ai_c$$

Starting at the same passive anode potential $E_p$, it is seen that the reactivation response (time required to drop to the active anode potential $E_a$) is fastest for the current pulse $Ci_c$ and slowest for the current pulse $Ai_c$.

Figure 3:
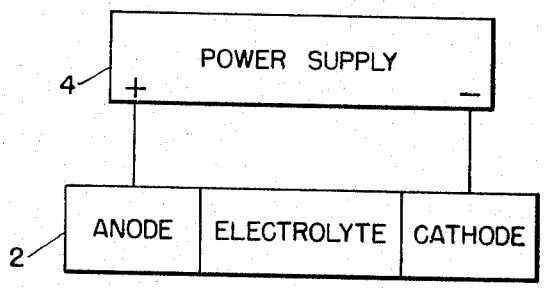
FIGS. 3–6 illustrate in a schematic fashion how the invention is practiced.
Figure 4:
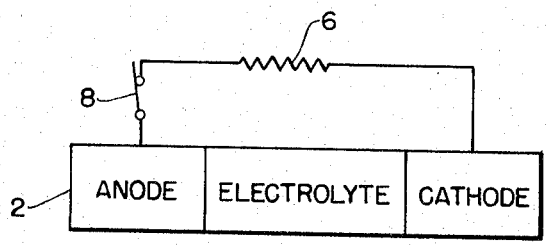
Figure 5:
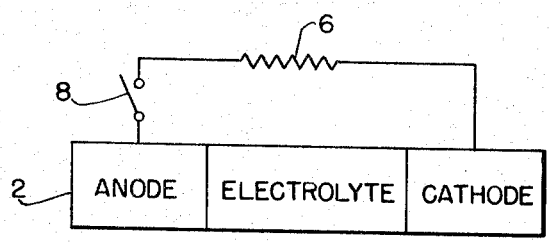

For the best results, battery cells are subjected to anode passivation as soon as possible after battery assembly. In the preferred form of the invention, the cell cathode is used as an auxiliary electrode to complete the current to an external power supply adapted to deliver current in an amount sufficient to achieve passivity. FIGS. 3, 4, and 5 illustrate one procedure for achieving passivation, maintaining passivity, and accomplishing reactivation of a battery anode. Each of these figures schematically illustrates a typical primary cell 2 essentially comprising a metal anode, an oxygen yielding electrolyte medium, and a low resistance cathode. To passivate the anode, the cell is coupled to an auxiliary power source 4 which is adapted to deliver a current exceeding the critical amount for passivity. Power source 4 may be a constant current source or a potentiostat. Assuming that it is a potentiostat, it is connected as shown so as to deliver an anodic current to the anode of the cell. The potentiostat operates to deliver current to the anode in an amount sufficient to shift the anode potential to the critical point, and then to deliver current in an amount sufficient to shift the anode potential to the passive region, at which point the power supply is decoupled from the cell and the latter is connected to a current-limiting resistance 6 and a normally closed switch 8 as shown in FIG. 4. The potentiostat may initially deliver a large surge of current if it is set initially at a potential in the passive region; alternatively it may be set initially in the active region and then gradually increased to a potential in the passive range. The resistance 6 has a value such as to pass just enough current to maintain the anode passive. At this point it is to be observed that the potential of a passive battery anode is quite close to that of the cathode, so that the E.M.F. of the cell is too small to produce any substantial current flow between anode and cathode. Hence, a battery with a passive anode is not capable of performing much useful work. To do this, the anode must be reactivated. For activation, switch 8 is opened as shown in FIGURE 5 so as to terminate the current used to maintain the anode passive. This allows the oxide film on the anode to dissolve in the electrolyte with a resultant return of the anode potential and the E.M.F. of the cell to their original active values.

Certain distinctions can be made between a passivated battery on the one hand and an exhausted battery or a fresh active battery on the other hand. A passivated battery is characterized by a relatively low rate of anode corrosion while an active battery has a relatively high rate of anode corrosion. An exhausted battery is characterized by complete or almost complete anode consumption or corrosion. A passivated battery also is characterized by a very thin but continuous and smooth oxygen-containing film which is strongly adherent to the anode. A fresh or nearly exhausted battery may have some oxide formed on its anode, but such oxide is not continuous, strongly adherent, or protective against corrosion. Instead, it generally is crystalline or flaky like rust on iron, and is in a hydrated form, such as an hydroxide. The potential difference between the electrodes of a passivated battery is quite small compared to an active battery. An exhausted battery may have an E.M.F. quite close to its original active value. However, it will not produce any degree of power if connected to a load.

Figure 6:
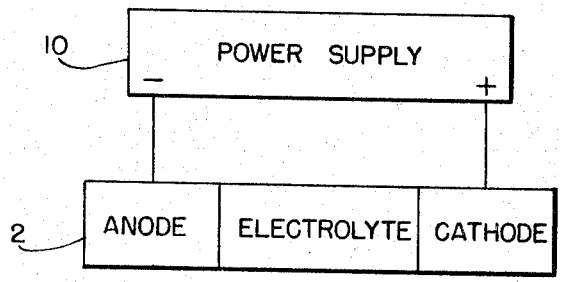

While the procedure outlined in FIGS. 3, 4, and 5 is satisfactory where reactivation time is not critical, the preferred procedure is to reactivate the anode by forced activation using an external power source as shown at 10 in FIG. 6. Depending on the circumstances of use of the cell, the reactivating current pulse may be derived from a conventional electronic power supply or from a small battery. Use of a conventional electronic power supply makes possible large cathodic current pulses which yield very short reactivation times.

Procedures and arrangements other than those shown in FIGS. 3 to 6 also are contemplated. For example, the simple resistance 6 could be replaced by a current limiting device using a diode while the decoupling of the resistance and cell could be achieved by means other than switch 8. It also is understood that the current required to maintain the anode passive need not be achieved by connecting the cell to a current limiting device but may be delivered by an external power source such as power supply 4 which could be made to yield a variable current. From the standpoint of procedure, it also is contemplated that the current supplied to the cell for activation may be increased slowly from zero to the critical level, and also may be decreased relatively slowly or rapidly from the critical level to the level required to maintain the anode passive. Thus passivity also can be achieved by initially supplying a surge of current from a constant current supply which not only causes the anode potential to reach the critical value but also places the anode in the transpassive range; thereafter the applied current is backed off until the potential reaches the passive range. In other words, decreasing the applied current from an initial high value sufficient to exceed the critical potential will result in a passive potential.

The invention is applicable to a wide variety of dry or wet primary and rechargeable primary cells. The important requirements are that the anode have an anodic polarization characteristic similar to that shown by FIG. 1 and also that the electrolyte contain a supply of oxygen which is available to form the anode passivating oxide film. Thus, for example, the invention is applicable to the following battery systems:

| | Anode | Electrolyte | Cathode |
|---|---|---|---|
| 1 | Zn | KOH | AgO (Ag$_2$O). |
| 2 | Zn | KOH | HgO. |
| 3 | Fe | H$_2$SO$_4$+Na$_2$SO$_4$ | m-Dinitrobenzene. |
| 4 | Al | KOH | AgO (Ag$_2$O). |
| 5 | Al | H$_2$SO$_4$+NaF+Na$_2$SO$_4$ | m-Dinitrobenzene. |

It is to be appreciated that the foregoing systems are represented in their simple or essential forms and that in fact they generally contain various electrode or electrolyte additives or involve specific variations required to achieve optimum operation. An indication of the nature of the additives and variations known to persons skilled in the art is provided by the technology handbook, "Space Batteries," published by the National Aeronautics and Space Administration (NASA SP-5004), 1964, and the publications referenced on pages 51-53 thereof.

The electrolyte mediums usually are aqueous, generally containing a quantity of water sufficient to give a solution from which the active electrolytes e.g. KOH, will not precipitate. It is important to note that such water also serves to provide oxygen for the anode passivating film. It also is contemplated that oxygen-yielding compounds may be added to the electrolyte medium for the specific purpose of assuring an adequate supply of oxygen to form the anode passivating film.

An important aspect of the invention is that a wide variety of conductive electrolyte solutions exhibit the property of establishing a passive range with metal anodes, the phenomenon being generally applicable to the oxy acids, bases and salts such as H$_2$SO$_4$, HNO$_3$, H$_3$PO$_4$, KOH, NaOH, LiOH, Al$_2$(SO$_4$)$_3$, and NH$_4$NO$_3$. An advantage of the invention is that it makes feasible a primary cell with an acid electrolyte and an anode that normally corrodes at a relatively rapid rate in an acid medium. For example, Fe anodes are not stable in an acid electrolyte and for this reason they have not been deemed usable with cathodes made of m-dinitrobenzene which requires an acid electrolyte such as $H_2SO_4$ and will not work well with an alkaline electrolyte. With the present invention, it is possible to passivate battery anodes made of Fe so that they will not corrode rapidly in an acid electrolyte.

The $Fe/H_2SO_4+Na_2SO_4/m$-dinitrobenzene battery system provides an illustration of the advantage of the present invention. An unpassivated iron anode will corrode in the aqueous electrolyte to yield $FeSO_4$ and $H_2$. When the anode is passivated, a film of iron oxide deposits on the anode and thus reduces the corrosion reaction to a very low rate. In a cell of this type, passivation may be achieved with an anodic current of the order of 0.1–1.0 amp./cm.$^2$, the anode may be kept passive with a current of the order of $10^{-6}$ amps./cm.$^2$, and reactivation may be accomplished in 1 second with a pulse of the order of $10^{-3}$ amps./cm.$^2$.

It is to be understood that although the invention is also applicable to secondary cells, its essential advantage and chief use is in extending the life of primary and rechargeable primary cells. As used herein, the term "rechargeable primary cell" is intended to cover primary cells which are rechargeable a limited number of times.

It is to be understood that the examples, terms, and expressions which are employed in the specification are used for the purpose of description and not for the purpose of limiting the invention or excluding use of equivalents, and that within the scope of the appended claims, various modifications, extensions, and variations, as well as substitutions of equivalents, may be made with respect to the described method and device without departing from the principles of the invention as described and illustrated.

I claim:

1. Method of extending the shelf life of a current producing battery cell of the kind comprising a cathode, an electrolyte, and an anode characterized by an anodic polarization curve conforming generally to the curve of FIG. 1 and exhibiting a potential in the active region of its anodic polarization, said method comprising the steps of passing through said cell by means of an external power supply an anodic current sufficient to shift the potential at said anode to a level in the passive region of said curve, and thereafter passing through said cell by means of an external current-limiting device connected across said cathode and anode a smaller anodic current sufficient to maintain the potential at said anode at a level in said passive region.

2. Method of claim 1 wherein said anode comprises a metal of the class consisting of zinc, iron and aluminum.

3. Method of claim 1 wherein said cell comprises the following system:

Anode _____ Zn
Electrolyte _____ KOH
Cathode _____ AgO (Ag$_2$O)

4. Method of claim 1 wherein said cell comprises the following system:

Anode _____ Zn
Electrolyte _____ KOH
Cathode _____ HgO

5. Method of claim 1 wherein said cell comprises the following system:

Anode _____ Fe
Electrolyte _____ $H_2SO_4+Na_2SO_4$
Cathode _____ m-dinitrobenzene 6. Method of claim 1 wherein said cell comprises the following system:

Anode _____ Al
Electrolyte _____ KOH
Cathode _____ AgO (Ag$_2$O)

7. Method of claim 1 wherein said cell comprises the following system:

Anode _____ Al
Electrolyte _____ $H_2SO_4+NaF+Na_2SO_4$
Cathode _____ m-dinitrobenzene 8. Method of passivating a current producing active cell of the kind comprising an anode and a cathode coupled by an oxygen-containing electrolyte with the potential at said anode at a level within the active region of its anodic polarization curve, said method comprising the steps of passing through said cell by means of an external power source an anodic current sufficient to produce an adherent oxygen-containing current-blocking film on said anode and shift the potential at said anode to a level in the passive region of said curve, and thereafter passing through said cell by external means a smaller anodic current sufficient to maintain said film and hold the potential at said anode to a level in said passive region.

9. Method of claim 8 further including the step of terminating said smaller current so as to permit dissolution of said film and the return of the potential at said anode to a level in said active region, whereby the cell is reactivated.

10. The method of claim 9 further including the step of subjecting said anode to a cathodic current so as to accelerate the dissolution of said film and the return of the potential at said anode to a level in said active region.

11. A cell comprising an anode and a cathode coupled by an oxygen-containing electrolyte and containing an adherent oxygen containing current blocking film on said anode, said cell having been passivated according to the method of claim 8.

References Cited by the Examiner

UNITED STATES PATENTS

| | | | |
|---|---|---|---|
| Re. 22,053 | 3/1942 | Ruben | 136—100 |
| 1,365,141 | 1/1921 | Adam | 204—147 |
| 2,463,483 | 3/1949 | Frasch | 204—248 X |
| 2,562,906 | 8/1951 | Hadley | 204—148 X |
| 2,834,728 | 5/1958 | Gallone | 204—147 |
| 2,869,064 | 1/1959 | Portail | 136—164 |
| 3,135,677 | 6/1964 | Fischer | 204—196 |
| 3,152,058 | 10/1964 | Hutchison et al. | 204—196 |

OTHER REFERENCES

Sudbury et al.: Corrosion, volume 16, No. 2, February 1960, pages 91–98.

WINSTON A. DOUGLAS, *Primary Examiner.*

ALLEN B. CURTIS, *Examiner.*

B. J. OHLENDORF, A. SKAPARS, *Assistant Examiners.*